United States Patent [19]

Wupper et al.

[11] Patent Number: 4,772,075
[45] Date of Patent: Sep. 20, 1988

[54] HYDRAULIC SERVO BRAKE SYSTEM WITH SLIP CONTROL AND WITH THROTTLE POINT IN SUPPLY VALVE

[75] Inventors: Hans Wupper, Friedrichsdorf; Karlheinz Haupt, Gau-Algesheim, both of Fed. Rep. of Germany

[73] Assignee: Alfred Teves GmbH, Frankfurt am Main, Fed. Rep. of Germany

[21] Appl. No.: 3,573

[22] Filed: Jan. 15, 1987

[30] Foreign Application Priority Data

Jan. 15, 1986 [DE] Fed. Rep. of Germany ....... 3600925

[51] Int. Cl.⁴ .............................. B60T 8/32; F15B 9/12
[52] U.S. Cl. ................................. 303/114; 137/596.17; 251/117; 303/119
[58] Field of Search ................ 303/114, 119, 116, 117, 303/118, 110, 61–63, 68–69, 113, 115, DIG. 3, DIG. 4; 188/181; 137/596.17, 625.65; 251/117, 129.01, 129.03, 129.15, 129.02; 91/31; 138/40, 45

[56] References Cited

U.S. PATENT DOCUMENTS

| | | | |
|---|---|---|---|
| 3,549,212 | 12/1970 | Leiber | 303/119 |
| 3,550,966 | 12/1970 | Leiber | 303/119 |
| 4,090,739 | 5/1978 | Iio | 303/119 X |
| 4,099,793 | 7/1978 | Iio | 303/119 X |
| 4,634,190 | 1/1987 | Wupper | 303/114 |
| 4,640,558 | 2/1987 | Nomura et al. | 137/596.17 X |
| 4,643,487 | 2/1987 | Newbrand | 303/119 X |
| 4,668,024 | 5/1987 | Nakanishi et al. | 303/119 |
| 4,685,749 | 8/1987 | Otsuki et al. | 303/119 X |

FOREIGN PATENT DOCUMENTS

| | | |
|---|---|---|
| 1924565 | 11/1970 | Fed. Rep. of Germany . |
| 2130906 | 12/1971 | Fed. Rep. of Germany . |
| 1755615 | 1/1972 | Fed. Rep. of Germany . |
| 3240404 | 5/1984 | Fed. Rep. of Germany . |

*Primary Examiner*—Douglas C. Butler
*Attorney, Agent, or Firm*—James B. Raden; Robert P. Seitter

[57] ABSTRACT

A hydraulic servo brake system with slip control. Brake circuits (18, 22, 25) with supply valves (28, 32, 35) and discharge valves (29, 33, 36) for the control of the wheel cylinder pressures during slip control are provided. Throttle points (38) are arranged within the supply valves. Each supply valve is bridged by an auxiliary valve (31, 34, 37) which is switchable into the closed position when the slip control action sets in. In this manner, the pressure gradient for the brake pressure build-up in the wheel cylinders is high before the slip control and low during the slip control.

4 Claims, 2 Drawing Sheets

HYDRAULIC SERVO BRAKE SYSTEM WITH SLIP CONTROL AND WITH THROTTLE POINT IN SUPPLY VALVE

BACKGROUND OF THE INVENTION

The present invention relates to a hydraulic servo brake system with slip control for automotive vehicles, with at least one brake circuit connected to the brake pressure chamber of a master cylinder and/or hydraulic power booster, with a slip monitoring and control device, with supply and discharge valves within the brake circuit for the control of the wheel cylinder pressures during slip control and with an auxiliary valve with switches over at the beginning of slip control. The auxiliary valve activates a throttle point within the brake circuit on the supply side and is switchable, in particular, in opposition to the force of a return spring by means of a control pressure occurring during slip control.

In a known servo brake system of this type (German printed and published patent application No. 32 40 404), the auxiliary valve is a slide valve which is common to all brake circuits and which has a plurality of change-over portions which are, in each case, arranged upstream of a supply valve. When the control pressure occurs, the slide is being displaced in opposition to the force of a return spring, that is, from a first position in which the passage is effected by way of a larger-cross section annular groove each, into a second position, in which the passage is effected by way of a smaller-cross section annular groove, that is a throttle point. The electromagnetically actuated supply and discharge valves are, in each brake circuit, united to form a slide valve.

Since brake pressure fluid is transmitted to the wheel cylinder by way of throttle point during the control action, the wheel cylinder pressure increases only gradually when the brakes are supplied, just as it is desired for a satisfactory slip control. However, up to the moment at which the slip monitoring and control device responds, the supply of brake fluid to the wheel brake is throttled considerably less, thus enabling a quicker pressure increase in the wheel cylinder.

The present invention has as an object to create a hydraulic servo brake system of the type initially referred to which it is possible to achieve a greater change of the gradient of the wheel cylinder pressure when the auxiliary valve switches over.

SUMMARY OF THE INVENTION

According to the invention, this object is achieved in that the throttle point is arranged within the supply valve, and in that each supply valve is bridged by means of an auxiliary valve which is switchable into the closed position when the slip control action sets in.

In this embodiment, pressure fluid can only flow to the wheel cylinder by way of the throttle point within the supply valve during slip control, whereas without slip control, the bridging path is, in addition, available. During slip control, the pressure gradient is determined solely by the design of the auxiliary valve, and the much higher pressure gradient existing without slip control is also due to the design of the auxiliary valve. It is, therefore, possible to chose a very great throttle point resistance which will result in an improved control quality, less control noises and a calmer brake pedal. In spite of this fact, a high pressure gradient is possible when the brakes are applied without slip control, since two parallel paths can be used, and the auxiliary valve can be designed so as to have a low resistance.

Since the auxiliary valve is only closed during slip control, it is also open during the filling and bleeding operation. Filling and bleeding valves are, therefore, not required within the area of the supply and discharge valves. In addition, the wheel cylinder pressure can be reduced in an unthrottled manner at the end of the slip control.

A particular advantage consists in that the auxiliary valve is a seat valve. Unlike a slide valve, a seat valve of this type can be easily designed such that it has a considerably low flow resistance in the open position.

In addition, it is favorable that the movable valve body carrying the valve closure means is provided with a larger pressure surface to be acted upon by he control pressure in the direction of closure and a smaller pressure surface directed in opposition to it which is to be acted upon by the wheel cylinder pressure in the direction of opening.

Therefore, the seat valve is, in addition, influenced in the direction of opening by the wheel cylinder pressure. As a consequence, the wheel cylinder pressure will cause a rapid opening of the auxiliary valve when the control pressure is omitted at the end of slip control. For this reason, a relatively weak return spring is sufficient. When the first and the second pressure surfaces are dimensioned properly, a non-return valve normally required for a quicker pressure reduction can be omitted.

From the design point of view it is favorable that the valve body is provided with a stepped piston which is sealedly guided within a stepped housing bore and which carries on the smaller-diameter face the closure means, and in that the stepped housing bore is, in each case outside of the overlap with the stepped piston, provided, laterally, with the opening of a channel connected with the inlet side of the supply valve in the smaller-diameter portion, with the valve seat connected with the outlet side of the supply valve on the face as well as with the opening of a control pressure channel in the larger-diameter portion. An auxiliary valve of this type operates in a reliable fashion and can be manufactured at low costs.

In a preferential embodiment, the auxiliary valve is arranged within the housing of the supply valve which is bridged by said auxiliary valve. Both valves have, therefore, been constructively combined from the beginning. Assembly costs and installation space are reduced thereby.

In particular, it is provided that the supply valve is an electromagnetically actuated seat valve with an axial inlet channel and a radial outlet channel, and in that the valve seat is connected by way of a channel arranged parallel to the axis with the radial outlet channel, and the working chamber arranged upstream of the valve seat is connected by way of a radial channel with the axial inlet channel. Thereby, a very compact design is achieved. The channels can be easily arranged as bores which are parallel to each other.

BRIEF DESCRIPTION OF THE DRAWING

The present invention will be described in more detail by means of a preferential embodiment illustrated in the accompanying drawing wherein.

DETAILED DESCRIPTION

Figure 1:
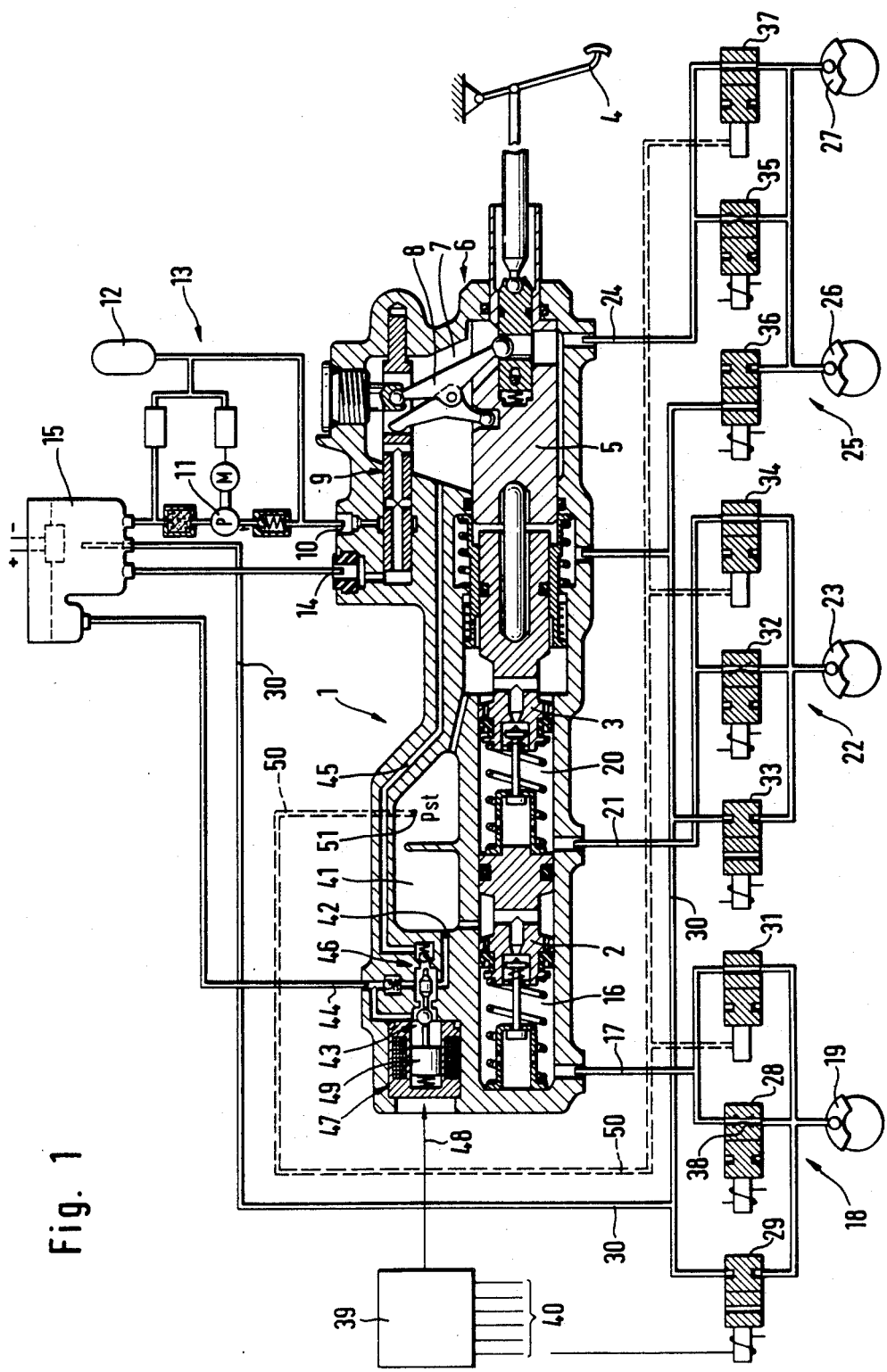
FIG. 1 shows a schematic illustration of a servo brake system according to the invention, i.e. a longitudinal cross section through a master cylinder with a hydraulic power booster arranged upstream of it.

FIG. 1 illustrates a master cylinder 1 with two master cylinder pistons 2 and 3 arranged one after the other, which are displaceable by means of a booster piston 5 of a hydraulic power booster 6 when a brake pedal 4 is applied. The booster piston 5 is then pressurized by the pressure in the booster pressure chamber 7. This pressure is controlled as a function of the pedal actuation by means of a brake valve 9 actuated by way of a lever linkage 8. For that purpose, a connection 10 is connected to a pressure supply system 13 comprising a pump 11 and an accumulator 12, and a second connection 14 is connected to a return reservoir 15. For further details, the German printed and published patent application No. 32 40 404 may be referred to.

On pedal actuation, the piston 2 delivers brake fluid from a pressure chamber 16 by way of a conduit 17 into a first brake circuit 18 for a wheel brake 19 which is, preferably, associated with a front wheel. The piston 3 delivers brake fluid from a pressure chamber 20 by way of a conduit 21 into a brake circuit 22 for a wheel brake 23 which is, preferably, associated with the other front wheel. The booster pressure chamber 7 is connected by way of a conduit 24 to a third brake circuit 25 for two wheel brakes 26 and 27 which are, preferably, associated with the two rear wheels.

The brake circuit 18 comprises a supply valve 28 which is normally open and establishes a communication between the conduit 17 and the wheel brake 19 and which closes on actuation, and, in addition, a discharge valve 29 which is normally closed and opens on actuation so that a communication between the wheel brake 19 and a return conduit 30 leading to the return reservoir 15 is established.

The supply valve 28 is bridged by means of an auxiliary valve 31 which is normally open and closes on actuation. Likewise, the brake circuit 22 comprises a supply valve 32, a discharge valve 33 and an auxiliary valve 34, and the brake circuit 25 comprises a supply valve 35, a discharge valve 36 and an auxiliary valve 37. In all cases, the supply valve is provided with a throttle point 38. The discharge valve 29, too, can be provided with such a throttle point, however, the throttling effect then being less. The flow resistance of the auxiliary valve 31 should be as low as possible in the open position.

A slip monitoring and control device 39 monitors the slip of the individual wheels and transmits control signals to the supply and discharge valves of the associated brake circuit by way of signalling lines 40 when an upper limit value is reached. In the present embodiment, the valves are supposed to be solenoid valves, and the control signals are supposed to be generated by means of a current. The valve pair switches over almost simultaneously. Due to the connection of the wheel cylinder with the return reservoir 15, the brake pressure drops. The moment the pressure falls short of a lower slip limit value, the valve pair again switches back into the depicted inoperative position. This action may be recur as long as a wheel lock risk exists.

The master cylinder is provided with a pre-chamber 41 serving as a replenishing chamber, which pre-chamber is normally connected by way of a channel 42 and a valve 43 with a return conduit 44 leading to the return reservoir 15 and thus has atmospheric pressure, however, when the slip monitoring and control device 39 responds, said pre-chamber is connected by way of a conduit 45 and a valve 46 to the pressure chamber 7 of the power booster 6. An electromagnet 47 which is actuated by way of a signalling line 48 by means of the slip monitoring and control device 39 during slip control serves to actuate the double valve 43, 46. The armature 49 carries the closure means of the valve 43 and is capable of pushing the spring-loaded closure means of the valve 46 open. Both valves 43 and 46 may, of course, be arranged separately from each other and may be provided with a proper control element each. The pre-chamber 41 is connected by way of non-return valves with the pressure chambers 16 and 20, thus allowing that amount of brake fluid which flows back to the return reservoir 15 during slip control to be transmitted from the pressurized pre-chamber into the brake circuits 18 and 22.

All three auxiliary valves 31, 34 and 37 communicate by way of a signalling line 50 with a connection 51 of the pre-chamber 41. The pre-chamber pressure thus serves as a control pressure $p_{st}$ for the actuation of the hydraulically switchable auxiliary valves 31, 34 and 37. The auxiliary valves, therefore, switch over into their closed position the moment a signal 48 indicating the beginning of the slip control is released and the pre-chamber is pressurized by means of the pressure of the booster pressure chamber 7.

When the slip control is not functioning, the pressure chambers 16, 20 and 7 are, therefore, in each case connected with the associated wheel brakes 19, 23 and/or 26 and 27 by way of a conduit having a very low flow resistance. In the event of a rapid actuation of the brake pedal 4, the brake pressure in the associated wheel cylinders, therefore, increases rapidly. A high pressure gradient is being generated. When the slip control sets in, the connection on the supply side is only possible by way of the supply valves 28, 32 and 35 and the throttle point 38 arranged therein. The pressure gradient is correspondingly low which is of interest to a calm control operation. Filling and bleeding of the brake systems can also be effected by way of the open auxiliary valves 31, 43 and 37 in an easy manner.

Figure 2:
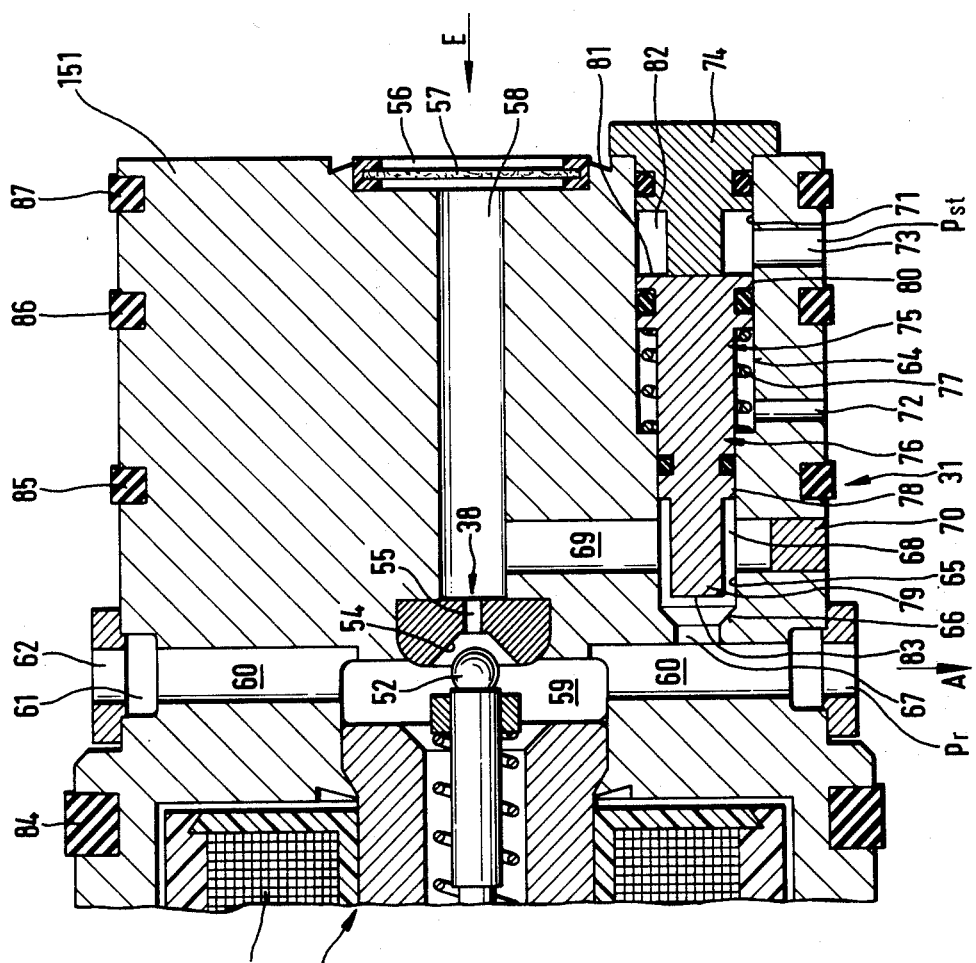
FIG. 2 shows a partial longitudinal cross section through a supply valve with installed auxiliary valve; and, FIG. 3 shows a modification of the circuitry according to FIG. 1.

FIG. 2 shows the way a supply valve 28 and an auxiliary valve 31 are assembled in a housing 151. The closure means 52 of the supply valve 28 is connected with the armature of an electromagnet which comprises a field coil 53. A bore 55 provided as throttle point 38 is arranged directly in the valve seat 54. Brake fluid is transmitted to the supply valve 28 by way of an inlet connection 56 with a filter 57 in the direction of arrow E and by way of an axial inlet channel 58. Extending from the working chamber 59 of the valve to an annular chamber 61 are a plurality of radial outlet channels 60, said annular chamber communicating with the outlets 62 through the intermediary of which brake fluid can be released into the direction of arrow A.

For the constitution of the auxiliary valve 31, a stepped bore 64 has been provided the smaller-diameter portion 65 of which is equipped with a valve seat 66 on the face, which valve seat in turn is connected by way of a channel 67 arranged parallel to the axis with the radial outlet channel 60. The working chamber 68 of the supply valve 64, which working chamber is arranged upstream of the valve seat 66, is connected by way of a radial channel 69 with the axial inlet channel 58 and is closed at the free end by means of a plug 70. The larger-diameter portion 71 of the stepped bore 64 comprises a first connection 72 for the communication with the return reservoir, and a second connection 73 for the communication with the control pressure conduit 50 and is closed on the face by means of a plug 74. The movable valve body 75 of the auxiliary valve 31 is provided with a stepped piston 76 which is sealedly guided within the stepped bore and which is loaded by means of a return spring 77. The smaller-diameter portion 78 carries, on the face, the closure means 79 of the valve. The larger-diameter portion 80 of the stepped piston 76 is provided with a larger pressure surface 81 directed towards a control pressure chamber 82. A, compared with the latter, smaller pressure surface 83 is constituted by means of the face of the closure means 79 and is influenced by the wheel cylinder pressure $p_r$ in the closed position.

The housing 151 is inserted into a bore provided with supply and discharge apertures, the sealing rings 84, 85, 86 and 87 thus sealing annular chambers for the admission and the discharge of pressure fluid relative to each other.

Therefore, the auxiliary valve 31 is a seat valve whose valve body is, in the closed position, loaded by the control pressure $p^{st}$ acting upon the larger pressure surface 81, on the one hand, and by the wheel cylinder pressure $p_r$ acting on the smaller pressure surface 83, on the other hand. As soon as the control pressure is omitted at the end of slip control, the valve opens very quickly under the influence of the return spring 77 and of the wheel cylinder pressure $p_r$, which pressure can then be reduced in an unthrottled manner.

Figure 3:
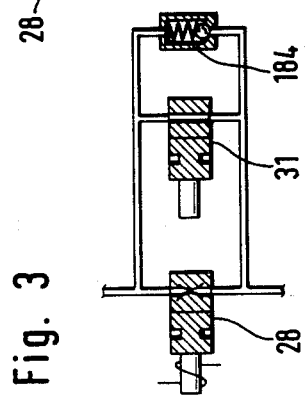

This effect is achievable in almost any case provided both pressure surfaces 81 and 83 have been dimensioned correspondingly. If additional safety is desired, it is possible to actuate a non-return valve 184 parallel to the supply valve 28 and the auxiliary valve 31, as shown in FIG. 3. This non-return valve can also be arranged in the housing 151.

It is obvious that the bridging auxiliary valve can also be used when the brake fluid is supplied in a different manner during slip control, for instance, directly from the pressure supply system 13. Furthermore, it is not necessary to control the auxiliary valve pressure-sensitivity since it can, for instance, also be switched over electromagnetically, pneumatically or in another manner.

What is claimed is:

1. A hydraulic servo brake system with slip control for automotive vehicles, with at least one brake circuit connected to the brake pressure chamber of a master cylinder of a hydraulic power booster, with a slip monitoring and control device, with supply and discharge valves within the brake circuit for the control of the wheel cylinder pressures during slip control and with an auxiliary valve which switches over at the beginning of slip control, said auxiliary valve activating a throttle point within the brake circuit on the supply side and being switchable in opposition to the force of a return spring by means of a control pressure occurring during slip control, wherein the throttle point is arranged within the supply valve and wherein each said supply valve is bridged by means of said auxiliary valve which is switchable into the closed position when the slip control action sets in, the auxiliary valve being a seat valve having a movable valve body, the movable valve body of the seat valve carries valve closure means and is provided with a larger pressure surface to be acted upon by the control pressure ($p_{st}$) in the direction of closure and a smaller pressure surface directed in opposition to it and to be acted upon by the wheel cylinder pressure ($p_r$) in the direction of opening.

2. A hydraulic servo brake system according to claim 1, wherein the valve body is provided with a stepped piston which is sealedly guided within a stepped housing bore and which carries on the smaller-diameter face the closure means, and in that the stepped housing bore is, in each case outside of the overlap with the stepped piston, provided, laterally, with the opening of a first outlet channel connected with the inlet side of the supply valve in the smaller-diameter portion, with the valve seat connected with the outlet side of the supply valve on the face as well as with the opening of a control pressure channel in the larger-diameter portion.

3. A hydraulic servo brake system according to claim 2, wherein the auxiliary valve is arranged within the housing of the supply valve which is bridged by said auxiliary valve.

4. A hydraulic servo brake system according to claim 3, wherein the supply valve is an electromagnetically actuated seat valve with an axial inlet channel and a radial outlet channel, and in that the valve seat of the auxiliary valve is connected by way of a channel arranged parallel to the axis with the first outlet channel, and the working chamber arranged upstream of the valve seat is connected by way of said first outlet channel with the axial inlet channel.

* * * * *